US010708275B2

(12) United States Patent
Silvis et al.

(10) Patent No.: US 10,708,275 B2
(45) Date of Patent: Jul. 7, 2020

(54) PAGE LOCK FOR NOTEBOOK APPLICATION

(71) Applicant: MICROSOFT TECHNOLOGY LICENSING, LLC, Redmond, WA (US)

(72) Inventors: Jason Silvis, Bellevue, WA (US); Suleiman Jabbouri, Redmond, WA (US); Sharad Sharma, Redmond, WA (US); Michael Tholfsen, New Castle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 15/696,944

(22) Filed: Sep. 6, 2017

(65) Prior Publication Data

US 2019/0075118 A1    Mar. 7, 2019

(51) Int. Cl.
*H04L 29/06* (2006.01)
*G06Q 10/00* (2012.01)
*G06F 21/60* (2013.01)
*G06F 40/166* (2020.01)

(52) U.S. Cl.
CPC ............ *H04L 63/104* (2013.01); *G06F 21/60* (2013.01); *G06F 40/166* (2020.01); *G06Q 10/00* (2013.01); *H04L 63/108* (2013.01)

(58) Field of Classification Search
CPC ...... H04L 63/104; H04L 63/106; G06F 17/24; G06F 21/60; G06Q 10/10; G06Q 10/00
USPC ............................................................. 726/28
See application file for complete search history.

(56) References Cited

U.S. PATENT DOCUMENTS

| | | | | |
|---|---|---|---|---|
| 5,347,295 | A * | 9/1994 | Agulnick | G06F 1/1626 345/156 |
| 6,272,484 | B1 * | 8/2001 | Martin | G06F 16/9562 |
| 6,802,041 | B1 * | 10/2004 | Rehm | G06F 16/40 715/201 |
| 9,542,538 | B2 * | 1/2017 | Le Chevalier | G06F 21/10 |
| 9,547,776 | B2 | 1/2017 | Tholfsen et al. | |
| 2003/0074302 | A1 * | 4/2003 | Cope | G16H 10/60 705/37 |

(Continued)

OTHER PUBLICATIONS

NPL Search Results (Year: 2020).*

(Continued)

*Primary Examiner* — Syed A Zaidi
(74) *Attorney, Agent, or Firm* — Talem IP Law, LLP

(57) ABSTRACT

Notebook applications may be employed to create, edit, and/or share collaborative documents. In a classroom setting, a notebook application may enable interactivity among a teacher and students. A page lock may be provided for the notebook application to prevent students from making unauthorized changes, such as editing a page after an assignment deadline or erasing teacher feedback, while still enabling the teacher read and write capabilities. For example, a notebook page may be rendered with read and write permissions for the teacher and student(s). The teacher may be provided an option to set a lock on the page to disable one or more of the students' write permissions. The teacher may select a first timing parameter associated with setting the lock, which defines a future date and time or event to trigger the disabling of the students' write permissions. The lock may be set based on the first timing parameter.

16 Claims, 12 Drawing Sheets

(56) References Cited

U.S. PATENT DOCUMENTS

| | | | |
|---|---|---|---|
| 2004/0048234 | A1 | 3/2004 | Allen et al. |
| 2007/0124673 | A1* | 5/2007 | Trotto .................. G06F 1/1626 |
| | | | 715/700 |
| 2008/0060080 | A1 | 3/2008 | Lim |
| 2009/0094514 | A1* | 4/2009 | Dargahi .................. G06F 16/95 |
| | | | 715/255 |
| 2009/0319910 | A1* | 12/2009 | Escapa .................. G06F 17/241 |
| | | | 715/751 |
| 2010/0151431 | A1 | 6/2010 | Miller |
| 2011/0302113 | A1* | 12/2011 | Smith ................. G06F 16/1734 |
| | | | 706/12 |
| 2013/0174032 | A1* | 7/2013 | Tse ........................ G06F 17/212 |
| | | | 715/273 |
| 2013/0174272 | A1* | 7/2013 | Chevalier ............... G06F 21/10 |
| | | | 726/28 |
| 2013/0191719 | A1* | 7/2013 | Underhill ............... G06Q 10/10 |
| | | | 715/231 |
| 2014/0359085 | A1 | 12/2014 | Chen |
| 2016/0148520 | A1 | 5/2016 | Bujsaim et al. |
| 2016/0162702 | A1 | 6/2016 | Tholfsen et al. |
| 2016/0188887 | A1 | 6/2016 | Ghafourifar et al. |
| 2016/0210275 | A1* | 7/2016 | Teevan ................. G06F 17/2205 |
| 2017/0046966 | A1 | 2/2017 | Velasquez et al. |
| 2017/0104713 | A1* | 4/2017 | Agarwal ................ G06Q 10/10 |

OTHER PUBLICATIONS

"Set Permissions for a Shared Folder, OneNote 2007, Instructions for Setting up your New Shared Notebook", Retrieved from: https://support.office.com/en-us/article/set-permissions-for-a-shared-folder-2b21241a-ce42-4f37-875b-3e014fc033bb, Jan. 1, 2007, pp. 1-8.

"International Search Report in PCT Patent Application No. PCT/US2018/037967", dated Oct. 4, 2018, 6 Pages.

"Page Restrictions—Atlassian Documentation", Retrieved from <<https://confluence.atlassian.com/doc/page-restrictions-139414.html>>, Retrieved on: Jul. 7, 2017, 5 Pages.

"Assignments—Blackboard at KU", Retrieved from <<https://blackboard.ku.edu/assignments>>, Retrieved on: Jul. 7, 2017, 2 Pages.

"Google Drive: How to Enable and Disable Offline Mode", Retrieved from <<http://www.dell.com/support/article/in/en/indhs1/SLN288763/google-drive-how-to-enable-and-disable-offline-mode?lang=EN>>, Retrieved on: Jul. 7, 2017, 2 Pages.

"Ability to share individual sections or pages (instead of entire notebooks)", Retrieved from <<https://onenote.uservoice.com/forums/327186-onenote-for-windows-windows-phone/suggestions/6159650-ability-to-share-individual-sections-or-pages-ins>>, Retrieved on: Jul. 7, 2017, 5 Pages.

* cited by examiner

PAGE LOCK FOR NOTEBOOK APPLICATION

BACKGROUND

Notebook applications, among other productivity services, may be employed for the creation, editing, and/or sharing of collaborative documents. For example, in a classroom setting, a teacher may create notebook pages for students in which they complete individual and/or collaborative assignments. The notebook enables an interactive way to provide feedback to the students as they are working on their assignments. However, after the teacher gives feedback on or grades content within the page, a student may easily update or change the content within the page or erase the teacher's feedback. Additionally, the student may add more content to the page despite the due date of the assignment having already passed.

Typically, to prevent the student from making such unauthorized changes, the entire document would need be copied to a separate folder to which the student has no access to ensure that the work couldn't be changed. However, this creates additional steps for the teacher and a potential for error when copying the document. Thus, it may be optimal to prevent the student from making unauthorized changes through an internal mechanism within the notebook application such that the document does not need to be copied and transferred to a different location.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a page lock for a notebook application. For example, a page of a notebook may be rendered with read permissions and write permissions for a group. A first user of the group may be provided an option to set a lock on the page that will disable the write permissions for at least a second user of the group. In response to detecting a selection of the option, at least a first timing parameter associated with setting the lock on the page may be received from the first user, where the first timing parameter may define a future date and time or a future event to trigger the disabling of the write permissions for the second user of the group. The lock may be set on the page based on the first timing parameter.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
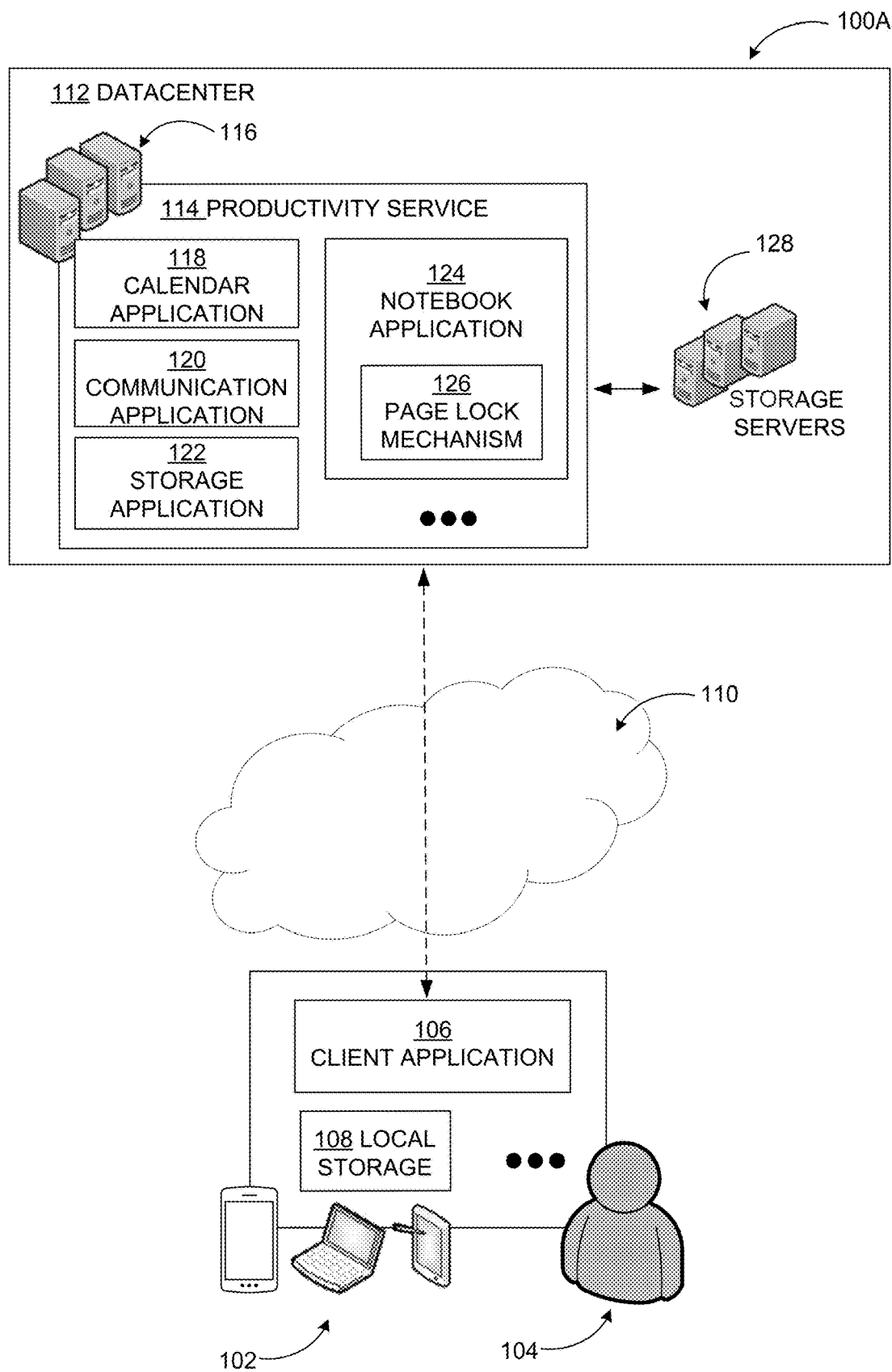
FIGS. 1A through 1C include display diagrams illustrating an example network environment where a system to provide a page lock for a notebook application may be implemented.

As briefly described above, embodiments are directed to providing a page lock for a notebook application. For example, a page of a notebook may be rendered with read permissions and write permissions for a group associated with the page. The group may consist of a teacher and students, for example, and the page may represent an individual or collaborative assignment for one or more of the students. A first user of the group, such as the teacher, may be provided an option to set a lock on the page that will disable the write permissions for at least a second user of the group, such as one or more of the students. In response to detecting a selection of the option, at least a first timing parameter associated with setting the lock on the page may be received from the first user. The first timing parameter may define a future date and time, such as a due date of the assignment, or a future event, such as a time-out after an initiation of the assignment or a submission of the assignment, to trigger the disabling of the write permissions for the second user. The lock may be set on the page based on the first timing parameter. Additionally and/or alternatively, the lock may be set on the page in response to the first user manually disabling the write permissions for the second user through selection of a lock command displayed through a user experience of the notebook application associated with the first user.

In some embodiments, a second timing parameter associated with removing the lock on the page may be optionally received from the first user, where the second timing parameter may define a future date and time or a future event to trigger the re-enabling of the write permissions for the second user. The lock may be removed based on the second timing parameter. Additionally and/or alternatively, the lock may be removed in response to the first user manually re-enabling the write permissions for the second user through selection of an unlock command displayed through a user experience of the notebook application associated with the first user.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing a page lock for a notebook application. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
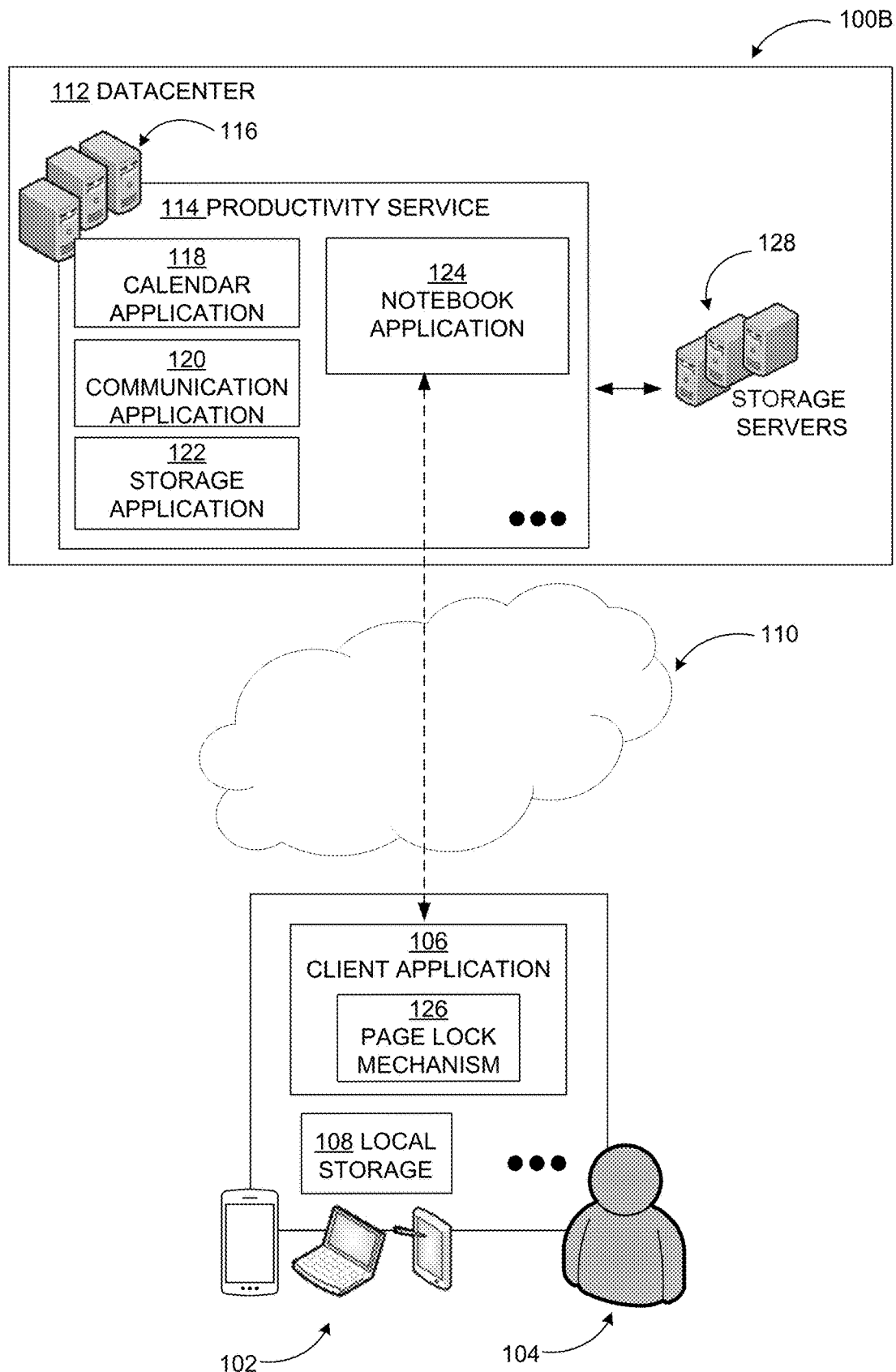
Figure 1C:
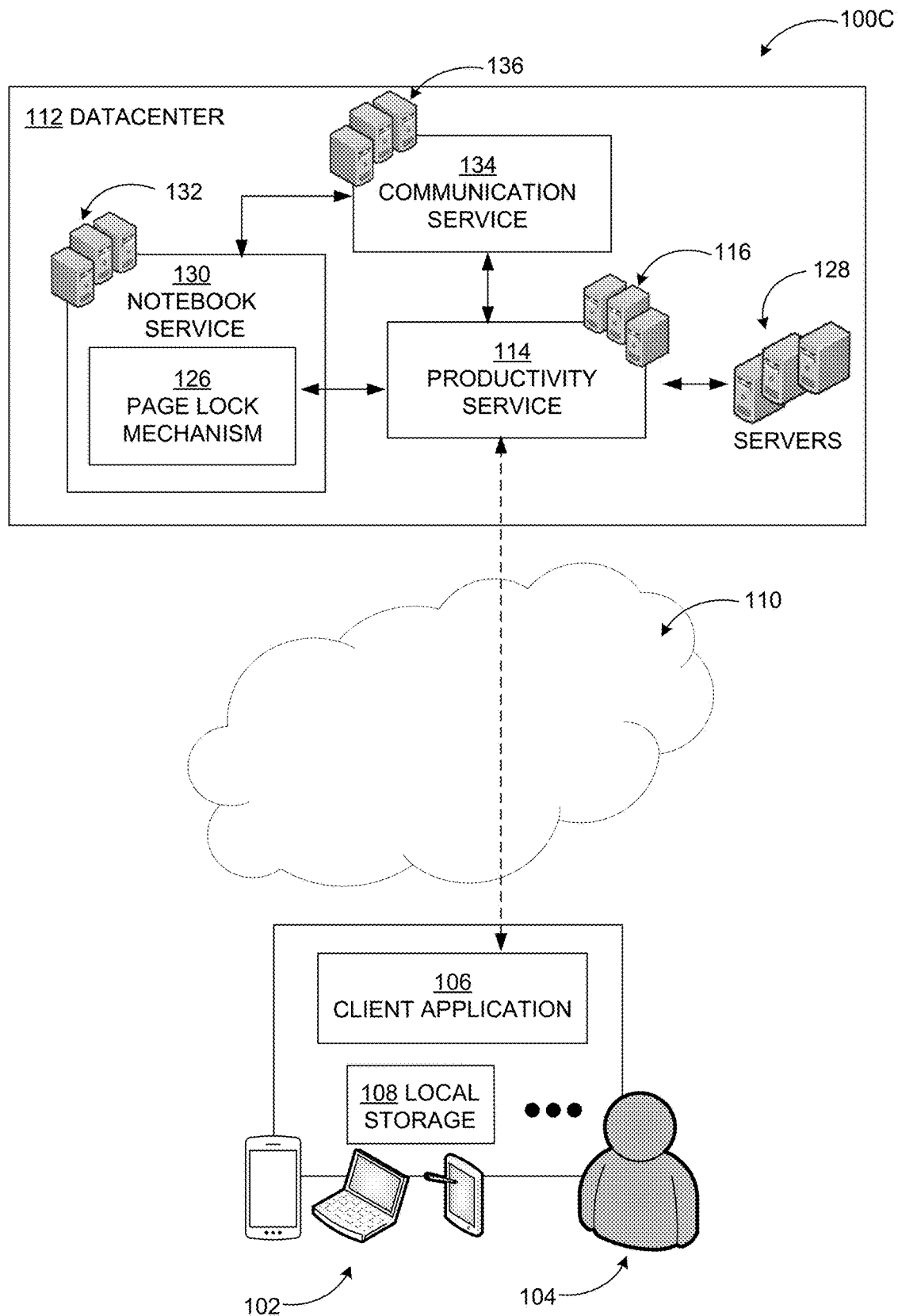

FIGS. 1A through 1C include display diagrams illustrating an example network environment where a system to provide a page lock for a notebook application may be implemented.

As illustrated in diagrams 100A through 100C, an example system may include a datacenter 112 executing a productivity service 114 on at least one processing server 116. The productivity service 114 may provide users various services and/or applications, including a calendar application 118, a communication application 120, a storage application 122, and a notebook application 124, among other similar applications (e.g., word-processing, presentation, and/or spreadsheet applications), that enable users to create, edit, manage, store, and share information. The productivity service 114 may be configured to interoperate with a client application 106 through one or more client devices 102 over one or more networks, such as network 110. For example, the productivity service 114 may allow users to access its services and/or applications through the client application 106 executed on the client devices 102. The client devices 102 may include a desktop computer, a laptop computer, a tablet computer, a vehicle-mount computer, a smart phone, or a wearable computing device, among other similar devices. In other examples, the productivity service 114 may be provided to a tenant (e.g., a business, an organization, or similar entities), which may configure and manage the services for their users. The information that is created, edited, stored, and/or shared using the various services and/or applications of the productivity service 114 may be stored locally in local storage 108 of the client devices 102 and/or remotely in storage servers 128 of the datacenter 112.

In one embodiment, as illustrated in diagram 100A of FIG. 1A, the processing server 116 may be operable to execute a page lock mechanism 126, where the page lock mechanism 126 may be integrated with the notebook application 124 of the productivity service 114. In another embodiment, as illustrated in diagram 100B of FIG. 1B, the client application 106 may be operable to execute the page lock mechanism 126, where the page lock mechanism 126 may be integrated with the client application 106 and the client application is associated with the notebook application 124. In a further embodiment, as illustrated in diagram 100C of FIG. 1C, the page lock mechanism 126 may be an integrated module of a separate notebook service 130 executed on at least one processing server 132 and configured to serve the productivity service 114 and/or multiple applications associated with the productivity service 114, such as the client application 106. In some examples, a communication service 134 executed on at least one processing server 136 may be configured to facilitate communications between the network service 130 and the productivity service 114. As described herein, the productivity service 114, the various applications provided by the productivity service 114, and the notebook service 130 may be implemented as software, hardware, or combinations thereof.

The page lock mechanism 126 may be executed in order to disable write permissions within a page of a notebook for certain users of a group associated with the page. In an example embodiment, to execute the page lock mechanism 126, the processing server 116 or 132 of the notebook application 124 or the notebook service 130, respectively, may be configured to render the page of the notebook with read permissions and write permissions for the group associated with the page. The group may consist of a teacher and students, for example, and the page may represent an assignment associated with one or more of the students depending on whether the students are working individually or collaboratively on the assignment. The processing server 116 or 132 may provide a first user 104 of the group, such as the teacher, an option to set a lock on the page that will disable the write permissions within the page for at least a second user of the group, such as one or more of the students. The option may allow the teacher to select timing parameters and which of the students will have write permissions disabled when the lock is set. For example, if the page represents an individual assignment associated with one of the students, only that particular student may have write permissions disabled when the page is locked. In another example, if the page represents a collaborative assignment associated with multiple students, each of those students or a portion of those students may have write permissions disabled when the page is locked.

In some embodiments, the option may enable the first user 104 to simultaneously set the lock on one or more additional pages of the notebook that are rendered with read permissions and write permissions to the group in order to disable the write permissions within the one or more additional pages for at least the second user of the group. For example, if a student's assignment has multiple components spread across several pages, such as a test that includes multiple choice questions in the page and an essay in an additional page, the same lock set on the page may be simultaneously set on the additional page. Additionally and/or alternatively, the option may enable the first user 104 to simultaneously set the lock on a corresponding page of the notebook that represents a same assignment or task but for another user (such as a third user, a fourth user, etc.) to disable the write permissions within the corresponding page for the other user. For example, if a teacher has multiple students and each student has a same but individual assignment, such as a book report, to be completed through a page of the notebook by a certain due date, the teacher may simultaneously set the lock on corresponding pages of the notebook that represent the book report for each of the users.

In response to detecting a selection of the option, the processing server 116 or 132 may receive at least a first timing parameter associated with setting the lock on the page from the first user 104. The first timing parameter may define a future date and time or a future event to trigger the disabling of the write permissions for the second user of the group. For example, if the page is associated with an assignment, the future date and time may be a due date of the assignment. For further example, the future event may be a time-out after an initiation of the assignment (e.g., one hour after a student starts a test) or a time at which a student completes and/or submits an assignment for grading. The processing server 116 or 132 may set the lock on the page based on the first timing parameter. Once the lock is set, only the first user 104 may have read and write permissions. The second user will be limited to read only permissions.

Additionally and/or alternatively, the processing server 116 or 132 may set the lock in response to the first user 104 manually disabling the write permissions for the second user. For example, the first user 104 may select a lock command displayed through a user experience of the notebook application 124 or the notebook service 130 associated with the first user 104 to set the lock. In an example scenario, the first user 104 may set a future date and time at which to trigger the disablement of the second users' write permissions within the page. However, the first user 104 may notice that the second user has already completed their tasks or assignments associated with the page ahead of the set date and time. Thus, the first user 104 may select to manually set the lock on the page.

In some examples, the second user may be offline when the lock is set. However, information associated with the first timing parameter may be stored in metadata of the page. As a result, even if the second user is offline, the lock may still be set on the page based on the stored first timing parameter causing the second user's write permissions to be disabled. For example, if the second user is working within the page on an airplane without wireless communication capabilities and the future date and time or future event defined by the first timing parameter occurs, the write permissions for the second user will be disabled such that the remaining user can no longer edit content within the page.

In additional embodiments, a second timing parameter associated with removing the lock on the page may be optionally received from the first user 104, where the second timing parameter may define a future date and time or a future event to trigger the re-enabling of the write permissions for the second user of the group. The lock may be removed based on the second timing parameter. For example, continuing with the teacher-student scenario, the second timing parameter may be one week following the setting of the lock to provide the teacher time to grade and provide feedback on the assignment, and then the page may be unlocked so that the students can then have the opportunity to revise and/or correct their assignment based on the teacher's feedback to receive a higher grade, for example. Similar to the first timing parameter, information associated with the second timing parameter may be stored in metadata of the page. As a result, even if the second user is offline when the second timing parameter occurs, the lock may be removed from the page based on the stored second timing parameter causing the write permissions for the second user re-enabled within the page.

Additionally and/or alternatively, the lock may be removed in response to the first user 104 manually re-enabling the write permissions for the second user of the group. For example, the first user 104 may select an unlock command displayed through the user experience of the notebook application associated with the first user 104 in order to remove the lock on the page.

While the teacher-student scenario is presented as an example herein, embodiments are not limited to a group comprised of a teacher and students. In other examples, the first user 104 of the group may be a user with a higher rank of authority and/or position over other users with whom the first user 104 interacts with in a collaborative environment, such as an administrator, a manager, or a team leader within a work environment, among other examples.

As previously discussed, notebook applications may be employed for the creation, editing, and/or sharing of collaborative documents, such as in a classroom setting. A notebook may enable interactivity among teachers and students with regard to lessons, assignments, and other resources to enhance the classroom learning experience. The teacher may require both read and write permissions to review and provide feedback within the page rendered by the notebook application. However, the teacher may be concerned about the students modifying the page or erasing the teacher's feedback within the notebook application after the teacher has reviewed the page or a deadline has passed. To prevent the student from making such unauthorized changes, conventionally, the content from the page would be copied to a separate folder to which the student has no access to ensure that the work couldn't be changed and then transferred back into the notebook application after review and grading. However, this creates additional steps for the teacher and a potential for an error when copying and transferring content from the page back and forth from the notebook application to the separate folder.

Thus, embodiments as described above are directed to providing a page lock for a notebook application to prevent the student from making unauthorized changes within the notebook application, where the page lock is an internal mechanism of the notebook application such that the content of the page does not have to be copied and transferred to and from a different location. Accordingly, provision of the page lock may reduce an amount of processing and an amount of storage needed. Additionally, provision of the page lock may improve user efficiency by saving the teacher time and potential error by not having to copy and transfer the content of the page back and forth from the notebook application to a separate location.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large number of users consuming productivity services, including notebook applications, to create, edit, and share documents.

Figure 2:
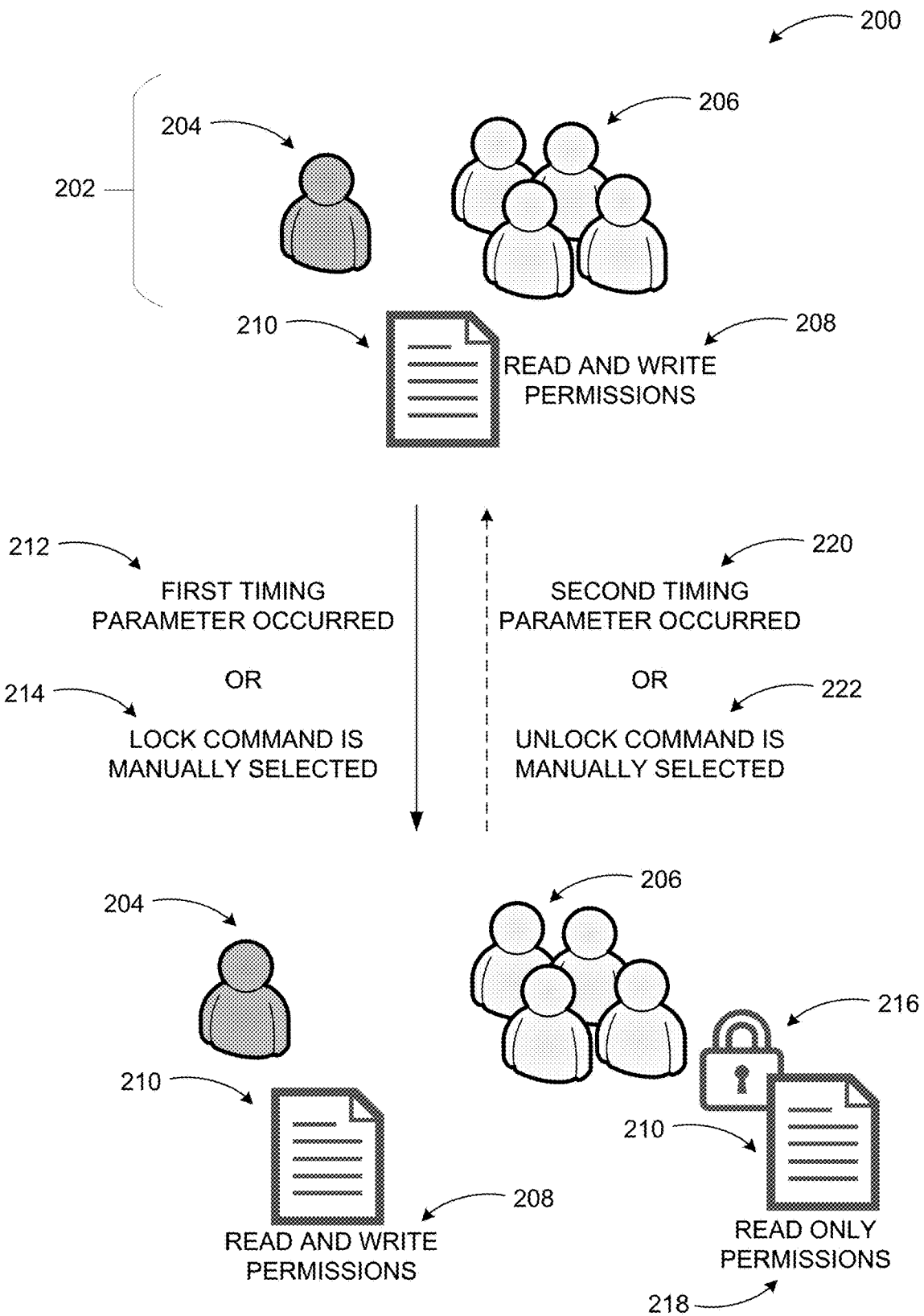
FIG. 2 includes a display diagram illustrating conceptually an example set of actions and components for providing a page lock for a notebook application.

FIG. 2 includes a display diagram illustrating conceptually an example set of actions and components for providing a page lock for a notebook application.

As shown in a diagram 200, a group 202 of users may be associated with a page 210 of a notebook that is created, edited and/or shared through a notebook application. The group 202 of users may include a first user 204 and at least one or more other users, referred to hereinafter as remaining user(s) 206 of the group 202. Initially, the page 210 may be unlocked and all users within the group 202 may have read permissions and write permissions 208 within the page 210. The first user 204 of the group 202 may be provided an option to set a lock on the page 210 in order to disable the write permissions for the remaining user(s) 206 of the group 202 within the page, while the first user 204 may maintain both the read and write permissions 208 within the page 210. The option may include timing parameters, where the lock may be set on the page 210 based on the timing parameters. For example, the timing parameters may include a first timing parameter associated with a setting of the lock on the page 210 and an optional second timing parameter associated with a removal of the lock from the page 210. For example, the timing parameters may include a start date and time for the lock, an end date and time for the lock, or other event-based start and/or end parameters for the lock. The option may also allow the first user 204 to select which of the remaining user(s) 206 to disable the write permissions for when the lock is set.

In some embodiments, the option may enable the first user 204 to simultaneously set the lock on one or more additional pages of the notebook that are rendered with read permissions and write permissions to the group 202 in order to disable the write permissions within the one or more additional pages for the remaining user(s) 206. Additionally and/or alternatively, the option may enable the first user 204 to simultaneously set the lock on corresponding pages of the notebook that represents a same assignment or task for each of the remaining user(s) 206 to disable the write permissions within the respective corresponding pages for the remaining user(s) 206.

In response to an occurrence of the first timing parameter 212, the page 210 may be locked 216 for the remaining user(s) 206 of the group 202 causing the remaining user(s) 206 to be limited to read only permissions 218 within the page 210. However, the first user 204 of the group 202 may still have both the read and write permissions 208 within the page 210. Alternatively, at any time, the first user 204 may manually select a lock command 214 for the page 210 that is provided through a notebook application user experience associated with the first user 204 in order for the page 210 to become locked 216 for the remaining user(s) 206 of the group.

In some embodiments, after the page 210 is locked 216, the lock on the page 210 may optionally be removed such that the remaining user(s) 206 return to having both read and write permissions 208 within the page 210. For example, the lock may be removed from the page 210 if the first user 204 sets a second timing parameter, such as a date and time or an event to trigger re-enablement of the write permissions for the remaining user(s) 206, and the second timing parameter has occurred 220. Alternatively, the lock may be removed from the page 210 at any time, if the first user 204 manually selects an unlock command 222 for the page 210 that is provided through the notebook application user experience associated with the first user 204.

Figure 3A:
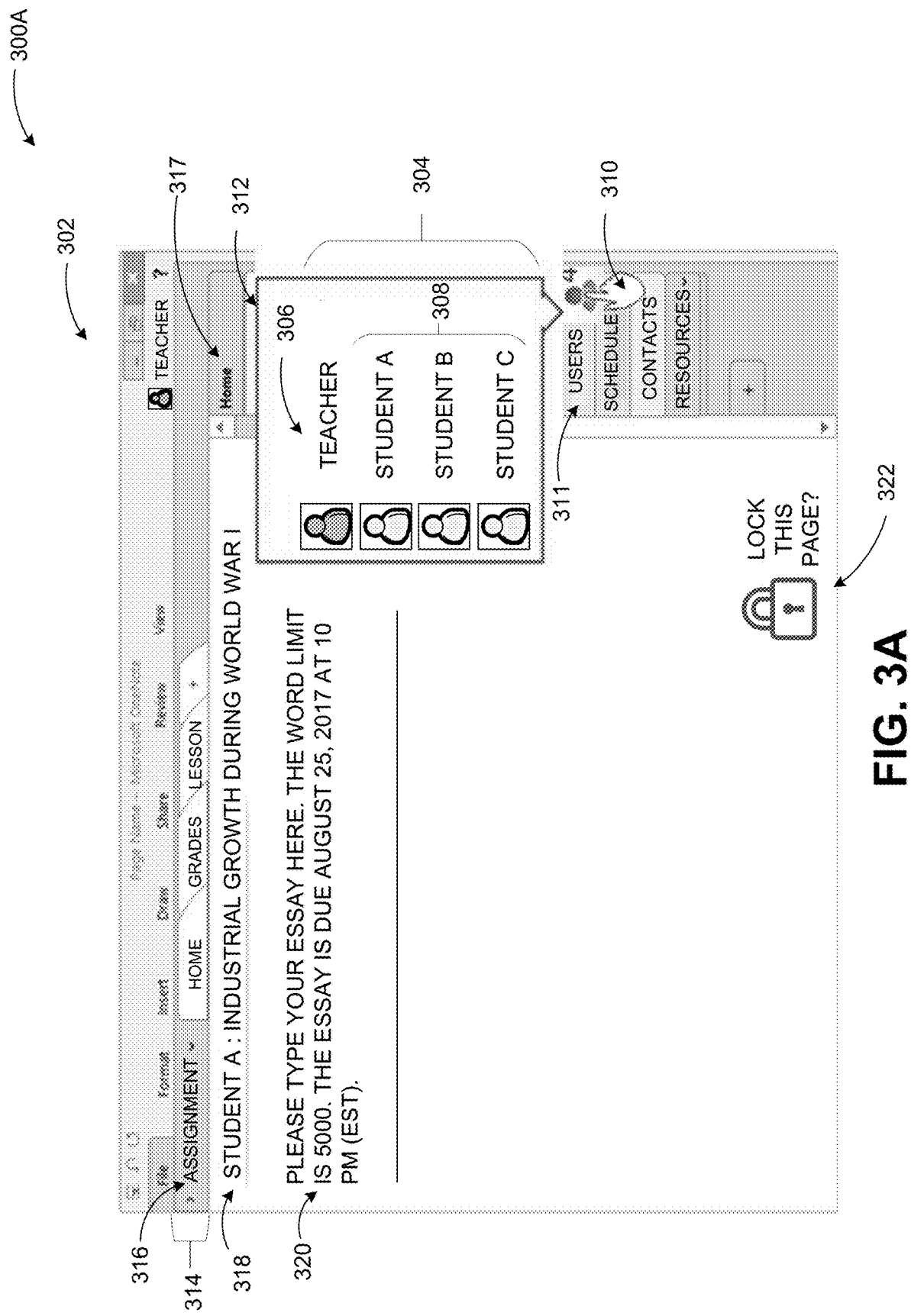
FIGS. 3A and 3B include display diagrams illustrating an example notebook application user experience associated with a teacher that is displayed to enable the teacher to set a lock on a notebook page.
Figure 3B:
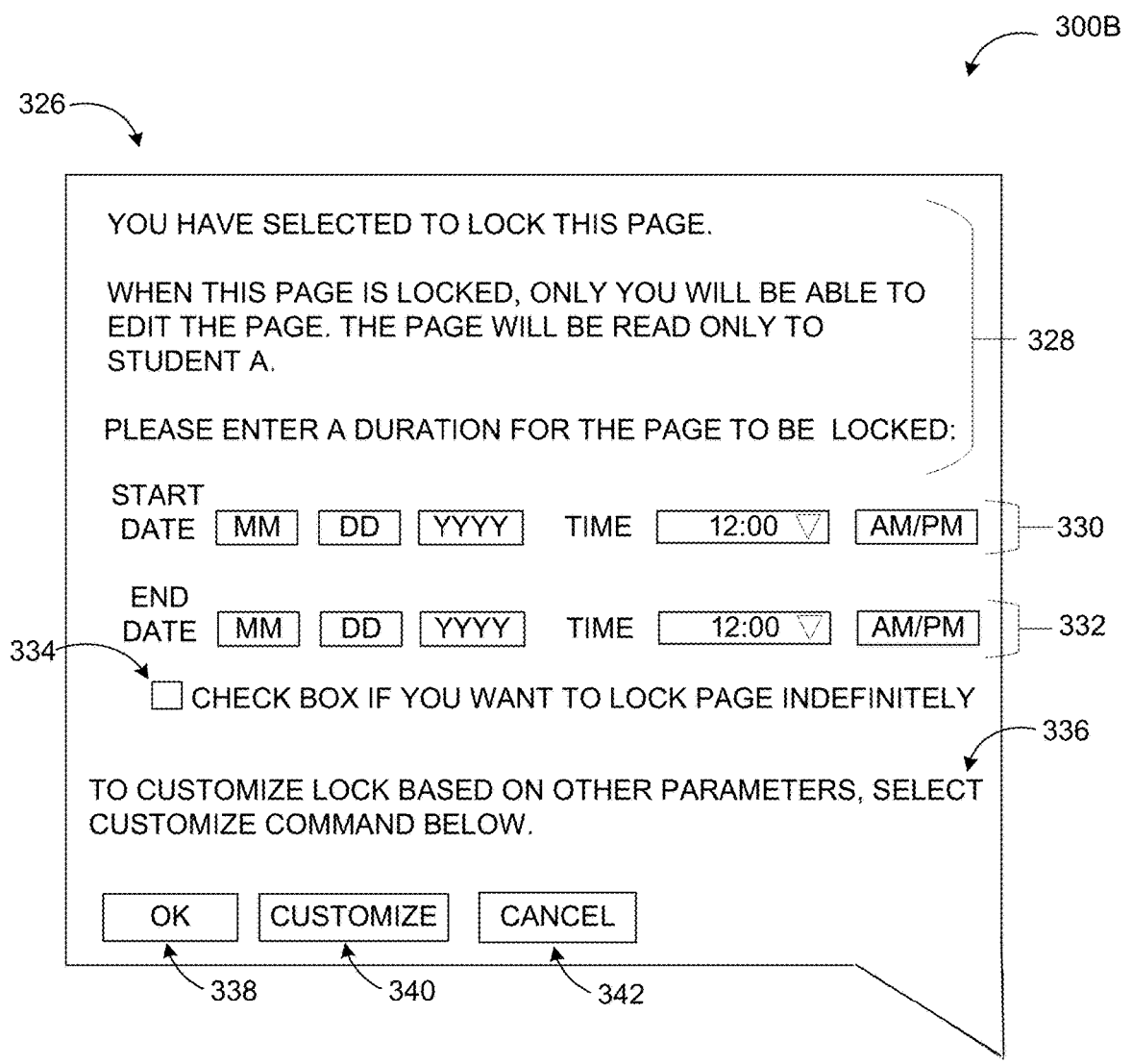
Figure 3B:
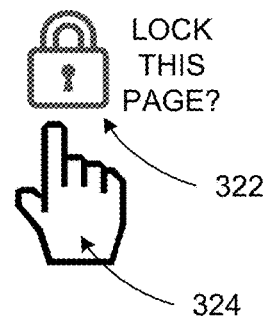

FIGS. 3A and 3B include display diagrams illustrating an example notebook application user experience associated with a teacher that is displayed to enable the teacher to set a lock on a notebook page.

A notebook application may include a multitude of documents following a common theme that may be organized hierarchically within the notebook application into objects, files, pages, sections, and/or notebooks. The documents may include spreadsheets, word processing documents, emails, calendars, presentations, and any other document. For example, in a classroom setting, a teacher may utilize a notebook application to enable students to interact and/or collaborate with the teacher and with one another, where a notebook may include all documents related to the classroom experience.

As shown in a diagram 300A, a notebook application user experience 302 associated with the teacher may display the notebook. The notebook may have one or more sections 314, such as Assignments 316, Home 317, Grades, and Lessons, where documents related to that particular aspect of the classroom experience are located. Each of the sections 314 may be comprised of one or more pages. In one example, the Home section 317 may have pages for users 311, a schedule, contacts, and resources, among other similar pages. In response to a selection 310 of the page for users 311, a menu 312 may be displayed that presents the users of a group 304 associated with the notebook, where the group may include a teacher 306 and students 308. In another example, the Assignments 316 section may have a page representing a student's individual assignment, such as a page 318 for student A's essay assignment about industrial growth during World War I, as illustrated. In other embodiments, a page may represent a collaborative assignment which multiple students are working on together. The page 318 may include instructions 320 on how to complete the assignment and a due date and time, for example. The page 318 may also include a lock command 322, where the lock command 322 may include graphics and/or text.

Initially, both the teacher 306 and student A may have read and write permissions on the page 318 so that student A may edit content within the page 318 to complete her assignment and the teacher 306 may provide initial feedback and/or make changes to the instructions 320 if needed based on student A's progress. However, the teacher 306 may select 324 the lock command 322 in order to disable the write permissions for student A within the page 318 such that she can no longer modify the page 318, as shown in a diagram 300B. In one embodiment, the teacher 306 may be provided an option to set a lock in advanced for a future date and time or a future event. For example, the option may be displayed in a menu 326. The menu 326 may include a prompt 328 that indicates a lock has been selected for the page 318, the effect of the lock (i.e., the teacher 306 will have editing capability, while the student A will have read-only permissions), and an instruction to please select timing parameters for the lock, such as a duration for the page 318 to be locked. Text boxes may be provided for the teacher 306 to enter a start date and time for the lock 330 and an end date and time for the lock 332. A check box 334 may be provided for selection if the lock is to remain on the page 318 indefinitely following the start date and time for the lock.

Additionally, an option to customize the lock 336 based on other parameters or conditions may be provided through a Customize command control 340. For example, event-based timing parameters may be used to set the lock. In an example scenario, corresponding pages of the notebook may represent an individual quiz assignment that each of the students 308 need to take. The teacher 306 may give the students 308 a three day time period in which the quiz is to be taken, where the students 308 have 30 minutes to take the quiz once they select to start the quiz. Once a student takes the quiz within the page, the teacher 306 may want to lock the page for that student so they cannot go back in and change answers. Thus, instead of having to monitor and manually lock each individual student's page once they have taken the quiz, the teacher 306 may use an event-based timing parameter (e.g., a time-out after an initiation of the assignment) to set the lock on the corresponding pages 30 minutes after each respective student selects to start their quiz within the corresponding pages. Other example event-based timing parameters may include a completion and/or submission of the assignments by the students.

Once the teacher 306 has selected respective timing parameters for the lock, the teacher 306 may select the OK command control 338. Or if the teacher 306 changes his mind or wants to make an edit to his selections, the teacher 306 may select the Cancel command control 342. Continuing with the previous example involving student A's assignment within the page 318 discussed in conjunction with diagram 300A of FIG. 3A, the lock may be set on the page 318 such that student A has read-only permissions in response to an occurrence of a timing parameter associated with the setting of the lock. The teacher 306 may continue to have both read and write permissions within the page 318 so they may review and provide feedback directly within the notebook application without the worry that student A will modify the page 318 to change her work or erase the teacher's feedback.

Additionally or alternatively, the teacher 306 may select the lock command 322 within the page 318 at any time to instantaneously set the lock on the page 318. For example, the teacher 306 may have selected a future start time and date for the lock, but the teacher 306 may notice that student A has completed the assignment ahead of time, and thus may choose to manually lock the page 318 earlier.

In some embodiments, the teacher 306 may set two timing parameters. A first timing parameter may be associated with the lock on the page 318 and a second timing parameter may be associated with removal of the lock on the page 318. In response to an occurrence of the second timing parameter, the lock may be removed from the page 318 and student A's write permissions within the page 318 may be re-enabled. Additionally or alternatively, the teacher 306 may, at any time, select an unlock command that may be displayed within a page 318 once it is locked to instantaneously remove the lock on the page 318.

Figure 4:
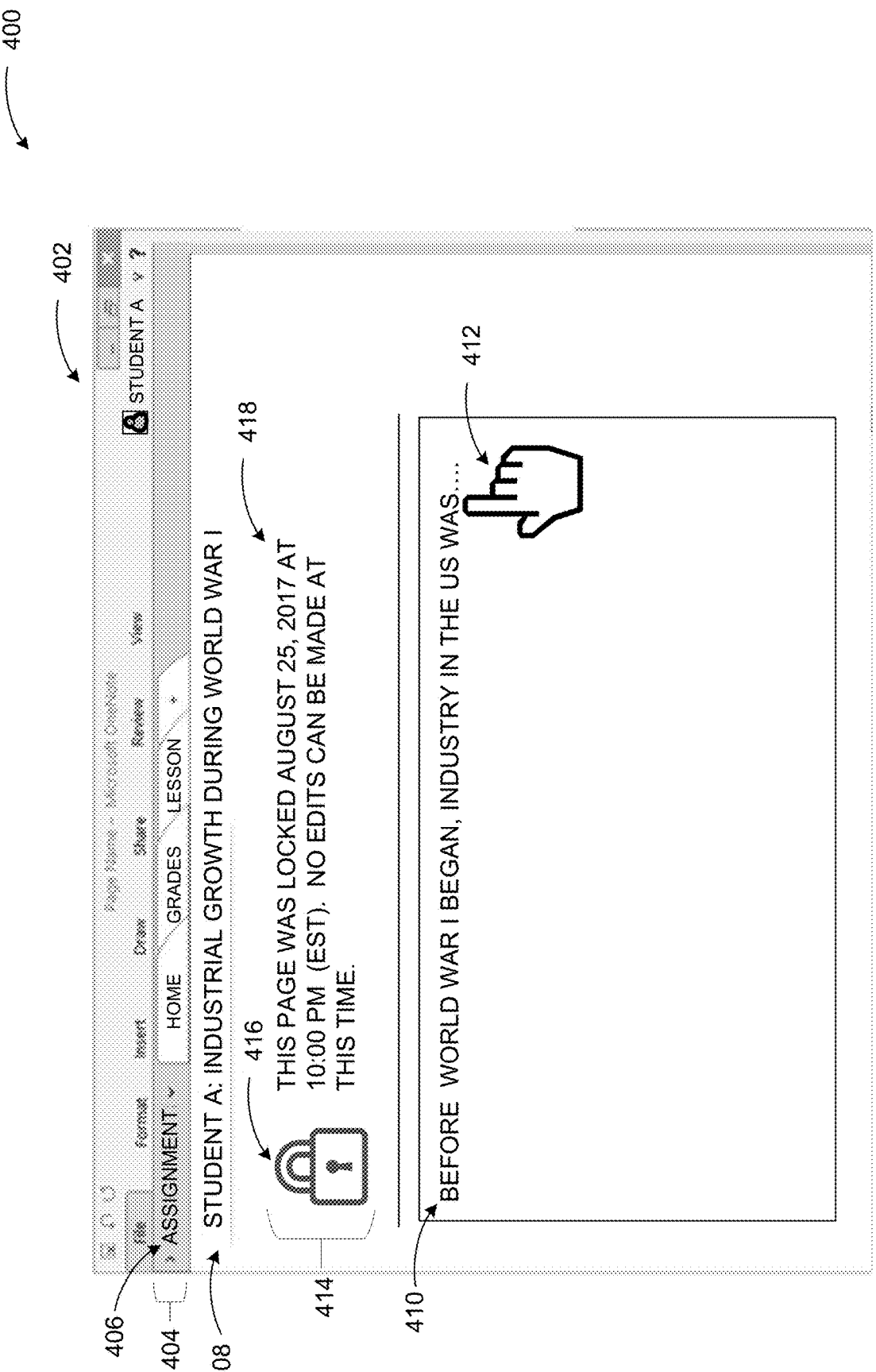
FIG. 4 includes a display diagram illustrating conceptually an example notebook application user experience associated with a student that is displayed when a notebook page is locked.

FIG. 4 includes a display diagram illustrating conceptually an example notebook application user experience associated with a student that is displayed when a notebook page is locked.

In a classroom setting, a teacher may utilize a notebook application to enable students to interact and/or collaborate with the teacher and with one another, where a notebook may include all documents related to the classroom experience. As shown in a diagram 400, a notebook application user experience 402 associated with a student may display the notebook. For illustrative purposes, the student may be one of the students (e.g., student A) of the group discussed in FIGS. 3A through 3B. The notebook may have one or more sections 404, such as Assignments 406, Home, Grades, and Lessons, where documents related to that particular aspect of the classroom experience are located. Each of the sections 404 may be comprised of one or more pages. For example, as illustrated, the Assignments 406 section may have a page that represents a student's individual assignment, such as a page 408 for student A's essay assignment about industrial growth during World War I.

Student A may initially have read permissions and write permissions within the page 408 such that she can enter and edit text 410 directly on the page 408 to complete the assignment. However, the teacher may have selected a timing parameter, such as a future date and time or a future event, to trigger a lock on the page that will disable the write permissions for student A. For example, the teacher may select the due date of the assignment as the timing parameter such that student A cannot make any further modifications to the assignment once the due date passes. Alternatively, the teacher may, at any time, manually select to lock the page 408 in order to disable the write permissions for student A.

If the timing parameter has occurred or the teacher has manually selected to lock the page, student A may now have read-only permissions. Accordingly, if student A attempts to perform an action 412 to edit the text 410 or other elements of the page 408 when the page 408 is locked, the action 412 is not performed and a message 414 may be displayed. The message 414 may include graphics 416 and/or textual information 418 that explains when the page 408 was locked and what effect the page 408 being locked has on student A, for example. Additionally, if the teacher further selected another timing parameter associated with removal of the lock on the page 408, the message may indicate when the lock will be removed and student A's write permissions will be re-enabled.

Figure 5:
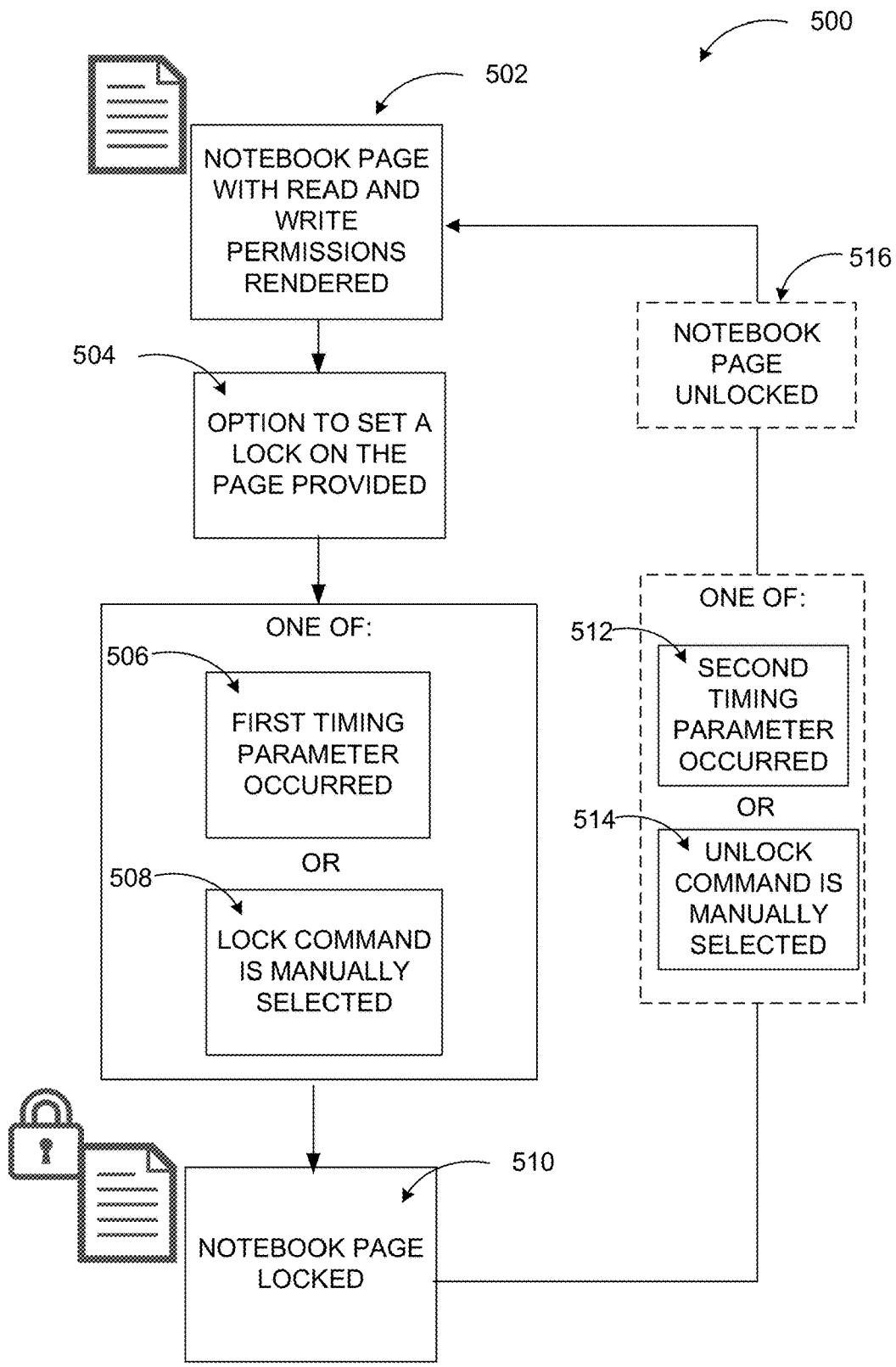
FIG. 5 includes a display diagram illustrating an example set of actions and components for providing a page lock for a notebook application.

FIG. 5 includes a display diagram illustrating an example set of actions and components for providing a page lock for a notebook application.

A notebook application may be employed for the creation, editing, and/or sharing of collaborative documents among a group of users. For example, the notebook application may include a multitude of documents following a common theme that may be organized hierarchically within the notebook application into objects, files, pages, sections, and/or notebooks. As shown in a diagram 500, a page of the notebook may be rendered with read permissions and write permissions for the group of users associated with the page at operation 502.

A first user of the group may be provided an option to set a lock on the page at operation 504 in order to disable write permissions within the page for one or more remaining users of the group. The first user of the group may have a higher rank of authority and/or position over remaining users of the group with whom the first user interacts in a collaborative environment, such as an administrator, a manager, a team leader, or a teacher within a work or classroom environment, among other examples. The option may allow the first user to select at least a first timing parameter associated with setting the lock on the page and which of the remaining users to disable the write permissions for. The first timing parameter may define a future date and time or a future event to trigger the setting of the lock. Alternatively, the first user may manually set the lock on the page through selection of a lock command provided through a user experience of the notebook application associated with the first user.

If either the first timing parameter has occurred at operation 506 or the lock command is manually selected at operation 508, the notebook page may be locked at operation 510. When the notebook page is locked, the selected remaining users for whom write permissions were to be disabled may have read-only permissions within the page, while the first user may maintain both read and write permissions within the page.

In some embodiments, the option may allow the user to select a second timing parameter associated with removing the lock from the page. The second timing parameter may define a future date and time or a future event following the set of the lock to trigger the removal of the lock on the page. Alternatively, the first user may manually remove the lock on the page through selection of an unlock command provided through the user experience of the notebook associated with the first user. If either the second timing parameter has occurred at operation 512 or the unlock command is manually selected at operation 514, the notebook page may be unlocked at operation 516. When the notebook page is unlocked, all users of the group may return to having both the read permissions and the write permissions within the page.

Figure 6:
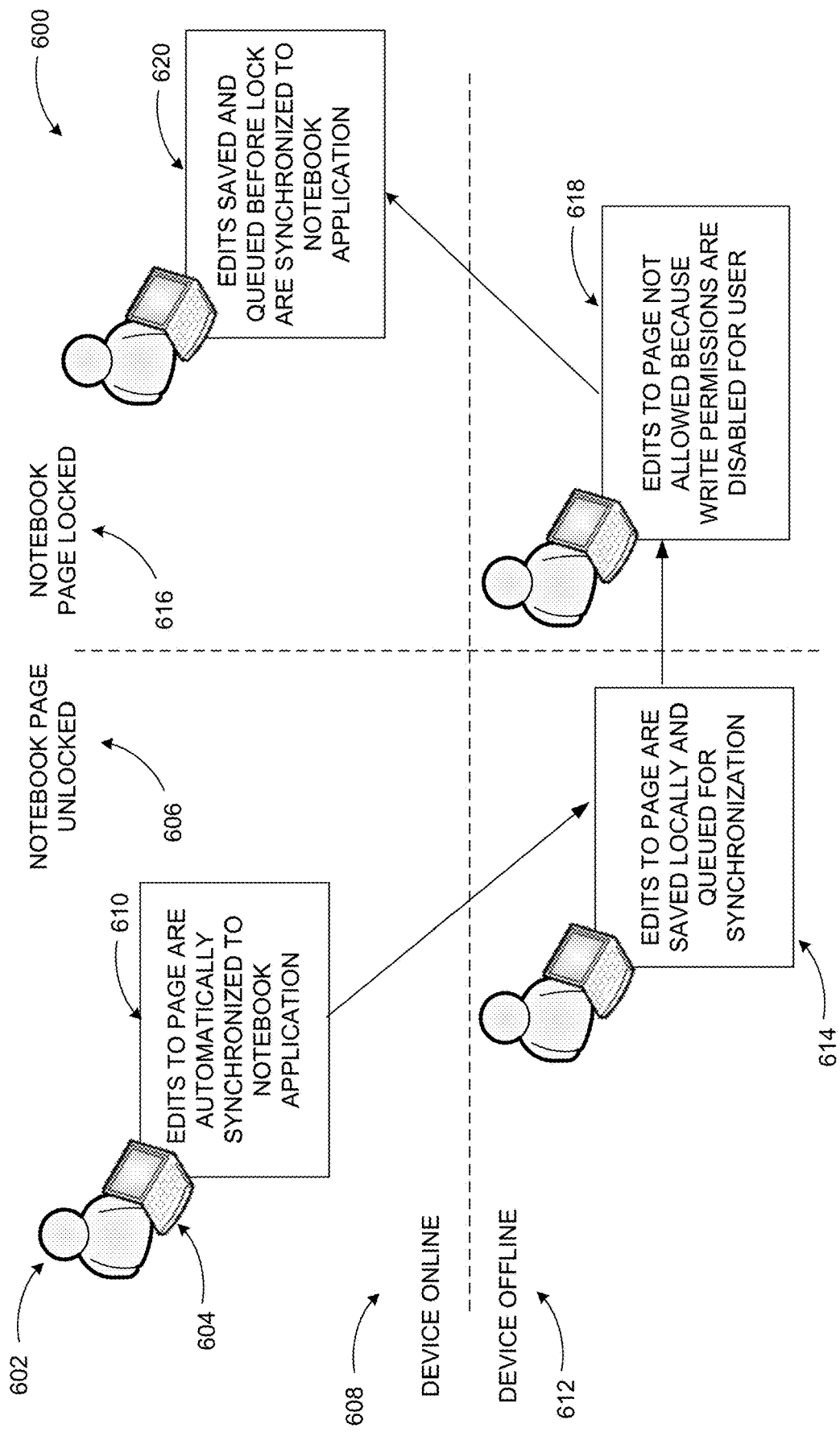
FIG. 6 includes a display diagram illustrating how a page lock for a notebook application operates when a user's device is offline.

FIG. 6 includes a display diagram illustrating how a page lock for a notebook application operates when a user's device is offline.

As shown in a diagram 600, a client application associated with a notebook application or service may be executed on a computing device 604 associated with a user 602. The user 602 may be a part of a group of users associated with a notebook provided through the notebook application. For example, the group may create, edit, and/or share collaborative documents through the notebook.

Initially, a page of the notebook that the user 602 is editing may be unlocked 606. When the page is unlocked 606, the user 602 may have read and write permissions within the page. Therefore, when the computing device 604 is online 608, and the user 602 makes edits to the page, at operation 610, the edits to the page are automatically synchronized to the notebook application or service through the client application. If the computing device goes offline 612, and the user 602 continues to make edits to the page, at operation 614, the edits to the page may be saved locally to the computing device 602 and queued for synchronization to the notebook application or service.

However, one of the users in the group may have selected to set a lock on the page in order to disable write permissions for one or more particular users of the group, such as the user 602. A first timing parameter associated with the setting of the lock and information regarding the particular users, including the user 602, for whom the write permissions are to be disabled may be received within the selection. Once the page is locked 616 in response to an occurrence of the first timing parameter, the user 602 has read only permissions within the page and can no longer edit the page.

In some embodiments, the first timing parameter and user information may be stored in metadata of the page. Storing the first timing parameter and user information within the metadata of the page my enable the lock to be set on the page for the particular users based on the stored first timing parameter even if the users are offline. Thus, if the particular users are offline and the stored first timing parameter has occurred, the write permissions may be automatically disabled within the page for those users. For example, as illustrated by operation 618, even if the computing device 604 is offline 612 when the first timing parameter occurs and the page is locked 616, further edits to the page by the user 602 are not allowed because the write permissions are automatically disabled within the page for the user 602 based on the first timing parameter and user information stored in the metadata on the page.

Once the computing device goes back online 608, at operation 620, the edits to the page that were saved locally and queued for synchronization before the page was locked may be synchronized to the notebook application or service through the client application The examples provided in FIGS. 1A through 6 are illustrated with specific systems, services, applications, user experiences, and scenarios. Embodiments are not limited to environments according to these examples. Providing a page lock for a notebook application may be implemented in environments employing fewer or additional systems, services, applications, user experiences, and scenarios. Furthermore, the example systems, services, applications, user experiences, and scenarios shown in FIGS. 1A through 6 may be implemented in a similar manner with other user interface or action flow sequences using the principles described herein.

Figure 7:
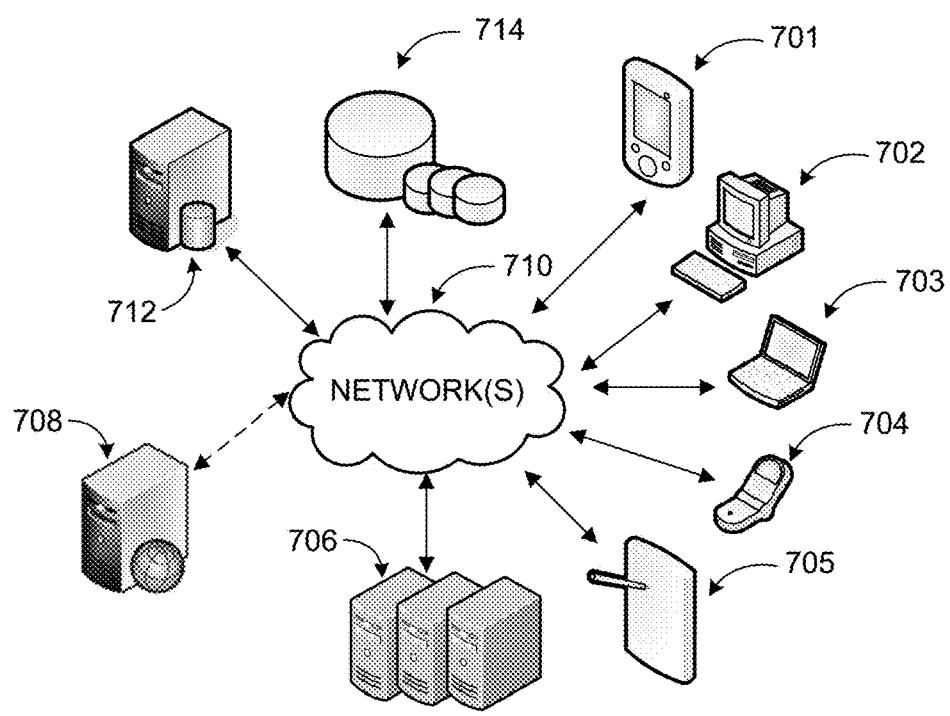
FIG. 7 is a networked environment, where a system according to embodiments may be implemented.

FIG. 7 is a networked environment, where a system according to embodiments may be implemented. A page lock mechanism as described herein may be executed in conjunction with hosted applications and services (for example, the notebook application 124 associated with the productivity service 114, the client application 106 associated with the productivity service 114, various other applications associated with the productivity service 114, the productivity service 114, or the notebook service 130) that may be implemented via software executed over one or more servers 706 or individual server 708, as illustrated in diagram 700. A hosted service or application may communicate with client applications on individual computing devices such as a handheld computer 701, a desktop computer 702, a laptop computer 703, a smart phone 704, a tablet computer (or slate), 705 ('client devices') through network(s) 710 and control a user interface presented to users.

Client devices 701-705 are used to access the functionality provided by the hosted service or client application. One or more of the servers 706 or server 708 may be used to provide a variety of services as discussed above. Relevant data may be stored in one or more data stores (e.g. data store 714), which may be managed by any one of the servers 706 or by database server 712.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the internet. Network(s) 710 may also coordinate communication over other networks such as PSTN or cellular networks. Network(s) 710 provides communication between the nodes described herein. By way of example, and not limitation, network(s) 710 may include wireless media such as acoustic, RF, infrared and other wireless media.

Many other configurations of computing devices, applications, engines, data sources, and data distribution systems may be employed to provide a page lock for a notebook application. Furthermore, the networked environments discussed in FIG. 7 are for illustration purposes only. Embodiments are not limited to the example applications, engines, or processes.

Figure 8:
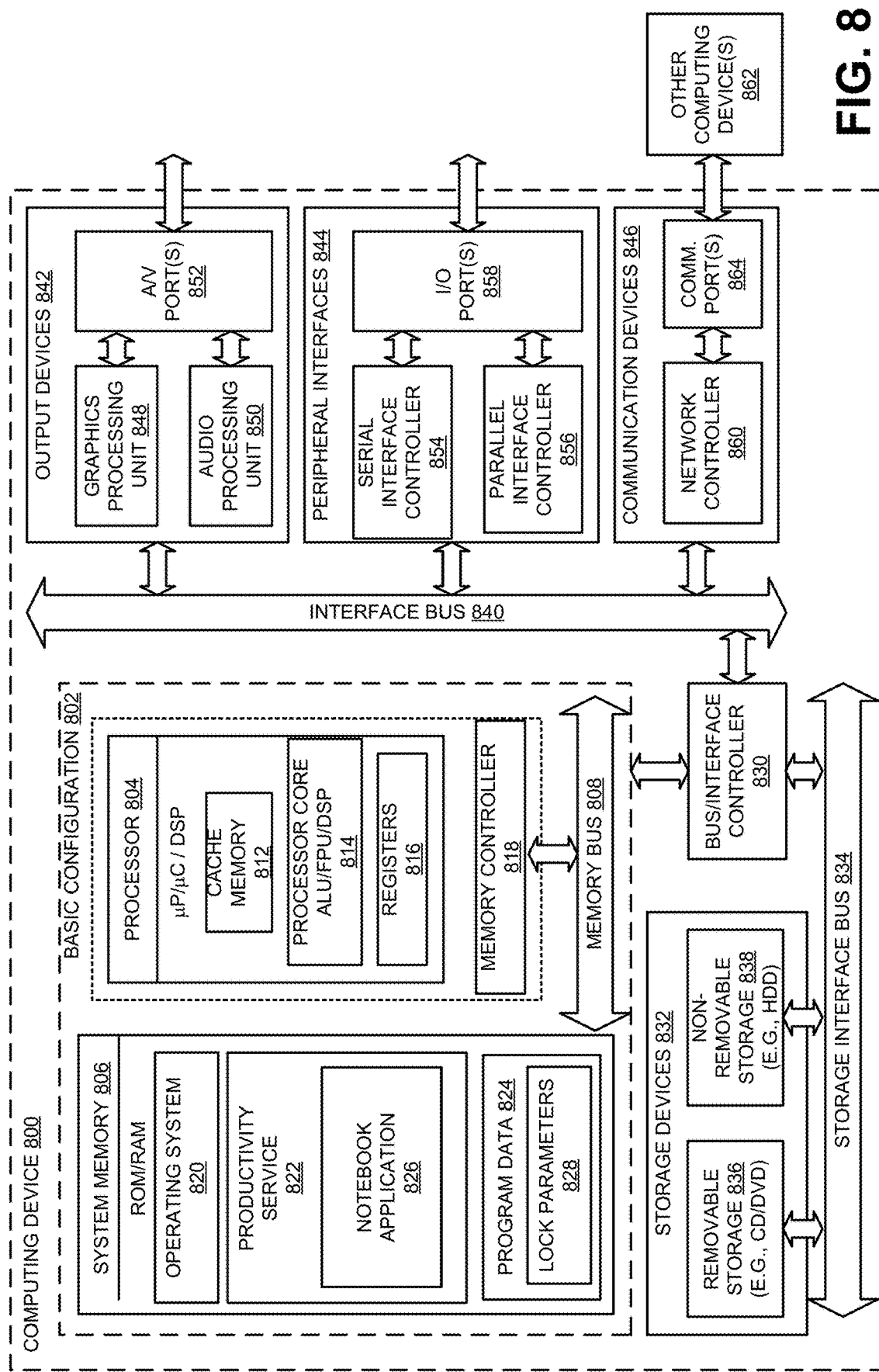
FIG. 8 is a block diagram of an example computing device, which may be used to provide a page lock for a notebook application.

FIG. 8 is a block diagram of an example computing device, which may be used to provide a page lock for a notebook application.

For example, computing device 800 may be used as a server, desktop computer, portable computer, smart phone, special purpose computer, or similar device. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (μP), a microcontroller (μC), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a productivity service 822, and program data 824. The productivity service 822 may include a notebook application 826, which may be an integrated module of the productivity service 822. The notebook application 826 may be configured to render a page of a notebook with read permissions and write permissions for a group and provide a first user of the group an option to set a lock on the page that will disable the write permissions for at least a second user of the group. The notebook application 826 may be further configured to, in response to detecting a selection of the option, receive from the first user at least a first timing parameter associated with setting the lock on the page, where the first timing parameter defines a future date and time or a future event to trigger the disabling of the write permissions for the second user of the group, and set the lock on the page based on the first timing parameter. The program data 824 may include, among other data, lock parameters 828, such as a first timing parameter associated with setting the lock, an optional second timing parameter associated with removal of the lock, and users (e.g. the at least second user) for whom write permissions are to be disabled, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 846) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more IO ports 858. An example communication device 846 includes a network controller 860, which may be arranged to facilitate communications with one or more other computing devices 862 over a network communication link via one or more communication ports 864. The one or more other computing devices 862 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods to provide a page lock for a notebook application. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
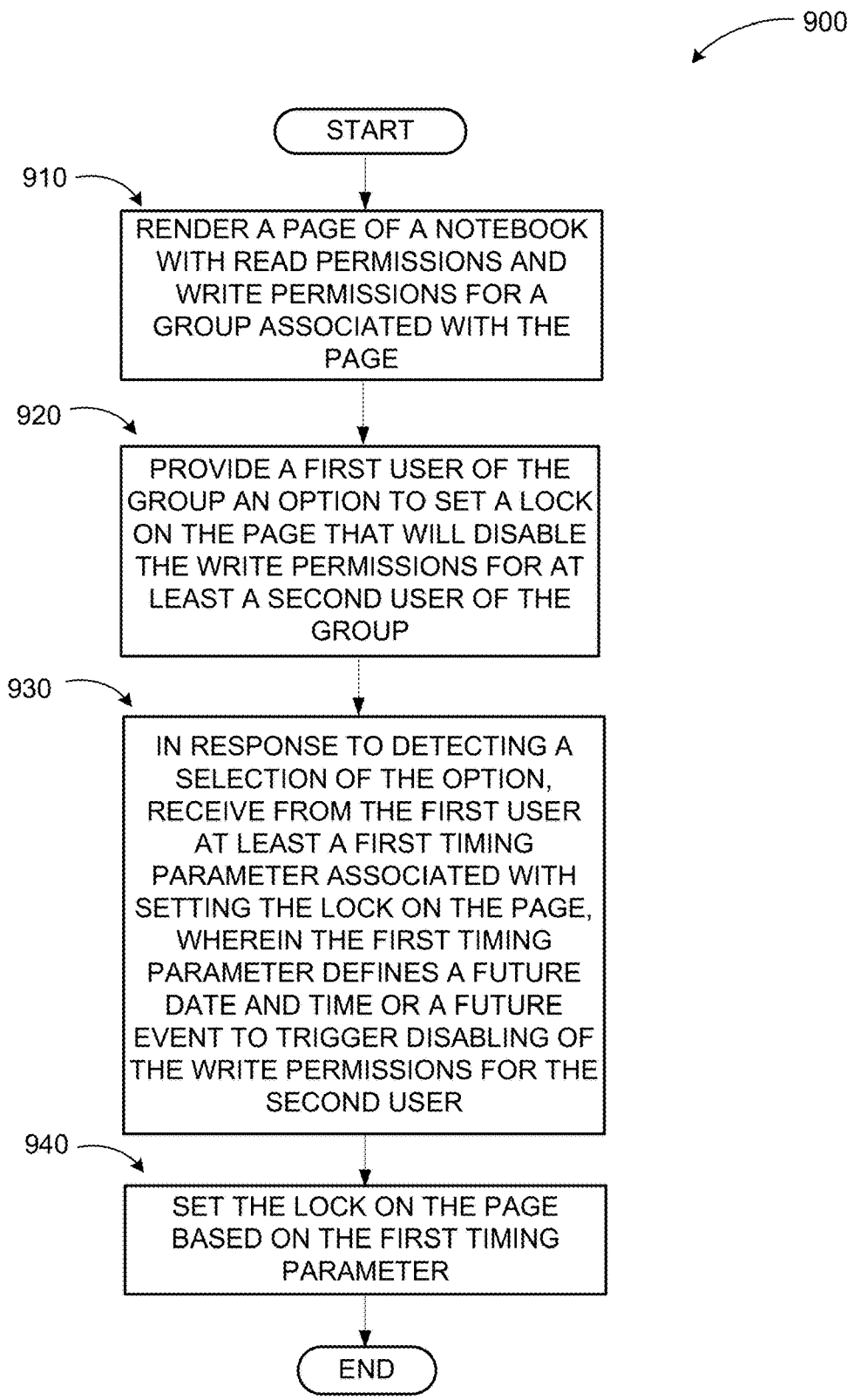
FIG. 9 illustrates a logic flow diagram of a method to provide a page lock for a notebook application, arranged in accordance with at least some embodiments described herein.

FIG. 9 illustrates a logic flow diagram of a method to implement an intelligent canvas to provide suggestions for task completion. Process 900 may be implemented on a computing device, server, or other system. An example server configured to execute a notebook application associated with a productivity service comprises a communication interface to facilitate communication between the server and one or more client devices. The example server may also comprise a memory to store instructions, and one or more processors coupled to the memory. The processors, in conjunction with the instructions stored on the memory, may be configured to execute a notebook application and provide a lock for a page rendered by the notebook application in order to disable write permissions for certain users of a group associated with the page.

Process 900 begins with operation 910, where the processors may be configured to render a page of a notebook with read permissions and write permissions for a group associated with the page. The group may consist of a teacher and one or more students, for example. The page may represent an assignment associated with a particular student or an assignment that multiple students are collaboratively working on.

At operation 920, the processors may be configured to provide a first user of the group an option to set a lock on the page that will disable the write permissions for at least a second user of the group. For example, the first user may be a teacher and the second user may be one of the students. The option may allow the teacher to select timing parameters and which of the students will have write permissions disabled when the lock is set (e.g., the second user in this scenario).

At operation 930, in response to detecting a selection of the option, the processors may be configured to receive from the first user at least a first timing parameter associated with setting the lock on the page. The first timing parameter may define a future date and time or a future event to trigger the disabling of the write permissions for the second user. In an optional embodiment, a second timing parameter associated with a removal of the lock from the page may also be received. The second timing parameter may define a future date and time or a future event to trigger the re-enabling of the write permissions for the second user.

At operation 940, the processors may be configured to set the lock on the page based on the first timing parameter. Once the lock has been set on the page, the second user may be limited to read only permissions within the page, while the first user maintains both read and write permissions within the page. If the optional second timing parameter is received, the lock may be removed on the page based on the second timing parameter such that the second user may return to having both read permissions and write permissions within the page.

The operations included in process 900 are for illustration purposes. Providing a page lock for a notebook application may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, means to provide a page lock for a notebook application may be provided. Example means may include rendering a page of a notebook with read permissions and write permissions for a group associated with the page and providing a first user of the group an option to set a lock on the page that will disable the write permissions for at least a second user of the group. Examples means may also include that in response to detecting a selection of the option, receiving from the first user at least a first timing parameter associated with setting the lock on the page, where the first timing parameter defines a future date and time or a future event to trigger the disabling of the write permissions for the second user of the group and setting the lock on the page based on the first timing parameter.

According to some examples, methods to provide a page lock for a notebook application may be provided. An example method may include rendering a page of a notebook with read permissions and write permissions for a group associated with the page, and providing a first user of the group an option to set a lock on the page that will disable the write permissions for at least a second user of the group. The example method may also include, in response to detecting a selection of the option, receiving from the first user at least a first timing parameter associated with setting the lock on the page, where the first timing parameter defines a future date and time or a future event to trigger the disabling of the write permissions for the second user of the group, and setting the lock on the page based on the first timing parameter.

In other examples, the first timing parameter may be stored in metadata of the page such that the lock is set on the page based on the stored first timing parameter when the second user is offline, and in response to a determination that the second user is offline and the stored first timing parameter has occurred, the write permissions may be automatically disabled for the second user. The lock on the page may be set in response to the first user manually disabling the write permissions for the second user of the group, where the first user may manually disable the write permissions by manually selecting a lock command displayed through a user experience of a notebook application.

In further examples, a second timing parameter associated with removing the lock on the page may be received from the first user, where the second timing parameter may define a future date and time or a future event to trigger re-enabling of the write permissions for the second user of the group, and the lock on the page may be removed based on the second timing parameter. The lock on the page may be removed in response to the first user manually re-enabling the write permissions for the second user of the group, where the first user may manually re-enable the write permissions by manually selecting an unlock command displayed through a user interface of a notebook application.

In yet further examples, the group associated with the page may include a teacher and at least one student, where the first user is the teacher and the second user is the at least one student. The provided option to set the lock on the page may enable selection of the first timing parameter associated with setting the lock on the page, a second timing parameter associated with removal of the lock on the page, and/or one or more remaining users of the group, including the at least second user of the group, for whom the write permissions for the page are to be disabled.

According to some embodiments, servers configured to provide a page lock for a notebook application may be described. An example server may include a communication interface configured to facilitate communication between the server and one or more client devices, a memory configured to store instructions, and one or more processors coupled to the communication interface and the memory and configured to execute the notebook application. The processors may be configured to render a page of a notebook with read permissions and write permissions to a teacher and a student, provide the teacher an option to set a lock on the page that will disable the write permissions for the student. The processors may be further configured to, in response to detecting a selection of the option, receive from the teacher at least a first timing parameter associated with setting the lock on the page, where the first timing parameter defines a future date and time or a future event to trigger the disabling of the write permissions for the student, and set the lock on the page based on the first timing parameter.

In other embodiments, the teacher may be provided another option to simultaneously set the lock on one or more additional pages of the notebook rendered with read permissions and write permissions to the teacher and the student in order to disable the write permissions within the additional pages for the student. The page may represent an assignment for the student, and the processors may be further configured to render a corresponding page of the notebook with read permissions and write permissions to a teacher and another student, where the corresponding page represents a same assignment for the other student, and provide the teacher another option to simultaneously set the lock on the corresponding page to disable the write permissions within the corresponding page for the other student.

In further embodiments, the notebook application may be an integral module of the productivity service, an integral module of a client application associated with the productivity service that is locally installed on the one or more client devices, or an integral module of a separate notebook service.

According to some examples, a system configured to provide a page lock for a notebook application may be described. An example system may include a first server configured to host a communication service, where the communication service facilitates communication between a second server and a third server, where the second server is configured to host a productivity service, and the third server is configured to host a notebook service associated with the productivity service. The second server may include a memory configured to store instructions and one or more processors coupled to the memory and configured to execute a notebook application of the notebook service. The processors may be configured to render a page of a notebook with read permissions and write permissions to a teacher and a student, and provide the teacher an option to set a lock on the page that will disable the write permissions for the student. The processors may also be configured to, in response to detecting a selection of the option, receive from the teacher a first timing parameter associated with setting the lock on the page and a second timing parameter associated with removal of the lock on the page, where the first timing parameter defines a future date and time or a future event to trigger disabling of the write permissions for the student and the second timing parameter defines a future date and time or a future event to trigger re-enabling of the write permissions for the student. The processors may be further configured to set the lock on the page based on the first timing parameter and remove the lock on the page based on the second timing parameter.

In other examples, the page may represent an assignment to be completed by the student. The future date and time to trigger the disabling of the write permissions for the student may a due date of the assignment. The future event to trigger the disabling of the write permissions for the at least one student may be a time-out after an initiation of the assignment or a submission of the assignment.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide a page lock for a notebook application, the method comprising:
   rendering a page of a notebook with read permissions and write permissions for a group associated with the page;
   providing a first user of the group an option to set a lock on the page that will disable the write permissions for at least a second user of the group;
   in response to detecting a selection of the option, receiving from the first user at least a first timing parameter associated with setting the lock on the page, wherein the first timing parameter defines a future date and time or a future event to trigger the disabling of the write permissions for the second user of the group;
   storing the first timing parameter in metadata of the page; and
   setting the lock on the page based on the first timing parameter, wherein setting the lock on the page based on the first timing parameter comprises:
   determining whether the second user is offline; and
   in response to the determination that the second user is offline and that the first timing parameter has been stored, automatically disabling the write permissions for the second user.

2. The method of claim 1, further comprising:
   setting the lock on the page in response to the first user manually disabling the write permissions for the second user of the group.

3. The method of claim 2, wherein the first user manually disables the write permissions by manually selecting a lock command displayed through a user experience of a notebook application.

4. The method of claim 1, further comprising:
   removing the lock on the page in response to the first user manually re-enabling the write permissions for the second user of the group.

5. The method of claim 4, wherein the first user manually re-enables the write permissions by manually selecting an unlock command displayed through a user interface of a notebook application.

6. The method of claim 1, wherein the group associated with the page includes a teacher and at least one student.

7. The method of claim 6, wherein the first user is the teacher and the second user is the at least one student.

8. The method of claim 1, wherein the provided option to set the lock on the page enables selection of one or more of: the first timing parameter associated with setting the lock on the page, a second timing parameter associated with removal of the lock on the page, or one or more remaining users of the group, including the at least second user of the group, for whom the write permissions for the page are to be disabled.

9. A server configured to provide a page lock for a notebook application, the server comprising:
- a communication interface configured to facilitate communication between the server and one or more client devices;
- a memory configured to store instructions; and
- one or more processors coupled to the communication interface and the memory and configured to execute the notebook application, wherein the one or more processors are configured to:
  - render a page of a notebook with read permissions and write permissions to a teacher and a student;
  - provide the teacher an option to set a lock on the page that will disable the write permissions for the student;
  - in response to detecting a selection of the option, receive from the teacher at least a first timing parameter associated with setting the lock on the page and a second timing parameter associated with removing the lock on the page, wherein the first timing parameter defines a future date and time or a future event to trigger the disabling of the write permissions for the student, wherein the second timing parameter defines a future date and time or a future event to trigger re-enabling of the write permissions for the student;
  - set the lock on the page based on the first timing parameter; and
  - remove the lock on the page based on the second timing parameter.

10. The server of claim 9, wherein the one or more processors are further configured to:
- provide the teacher another option to simultaneously set the lock on one or more additional pages of the notebook rendered with read permissions and write permissions to the teacher and the student in order to disable the write permissions within the one or more additional pages for the student.

11. The server of claim 9, wherein the page represents an assignment for the student, and
the one or more processors are further configured to:
- render a corresponding page of the notebook with read permissions and write permissions to a teacher and another student, wherein the corresponding page represents a same assignment for the other student; and
- provide the teacher another option to simultaneously set the lock on the corresponding page to disable the write permissions within the corresponding page for the other student.

12. The server of claim 9, wherein the notebook application is one of:
- an integral module of a productivity service;
- an integral module of a client application associated with the productivity service that is locally installed on the one or more client devices; or
- an integral module of a separate notebook service.

13. A system configured to provide a page lock for a notebook application, the system comprising:
- a first server configured to host a communication service, wherein the communication service facilitates communication between a second server and a third server;
- the second server configured to host a productivity service;
- the third server configured to host a notebook service associated with the productivity service, the second server comprising;
  - a memory configured to store instructions; and
  - one or more processors coupled to the memory and configured to execute a notebook application of the notebook service, wherein the one or more processors are configured to:
    - render a page of a notebook with read permissions and write permissions to a teacher and a student;
    - provide the teacher an option to set a lock on the page that will disable the write permissions for the student;
    - in response to detecting a selection of the option, receive from the teacher a first timing parameter associated with setting the lock on the page and a second timing parameter associated with removal of the lock on the page, wherein the first timing parameter defines a future date and time or a future event to trigger disabling of the write permissions for the student and the second timing parameter defines a future date and time or a future event to trigger re-enabling of the write permissions for the student;
    - set the lock on the page based on the first timing parameter; and
    - remove the lock on the page based on the second timing parameter.

14. The system of claim 13, wherein the page represents an assignment to be completed by the student.

15. The system of claim 14, wherein the future date and time to trigger the disabling of the write permissions for the student is a due date of the assignment.

16. The system of claim 14, wherein the future event to trigger the disabling of the write permissions for the student is one of a time-out after an initiation of the assignment or a submission of the assignment.

* * * * *